Oct. 4, 1938.                F. M. HARRIS                 2,131,888
                     AUTOMOBILE LIGHTING SYSTEM
                      Filed Nov. 6, 1933           6 Sheets-Sheet 2

INVENTOR.

Floyd M. Harris

INVENTOR.
Floyd M. Harris

Oct. 4, 1938. F. M. HARRIS 2,131,888
AUTOMOBILE LIGHTING SYSTEM
Filed Nov. 6, 1933 6 Sheets-Sheet 4

INVENTOR.
Floyd M. Harris

Oct. 4, 1938.  F. M. HARRIS  2,131,888
AUTOMOBILE LIGHTING SYSTEM
Filed Nov. 6, 1933   6 Sheets—Sheet 6

INVENTOR.
Floyd M. Harris

Patented Oct. 4, 1938

2,131,888

UNITED STATES PATENT OFFICE 2,131,888

AUTOMOBILE LIGHTING SYSTEM

Floyd M. Harris, Merchantville, N. J.

Application November 6, 1933, Serial No. 696,801

14 Claims. (Cl. 88—1)

My invention relates to vehicle lighting systems and particularly to a system for eliminating or reducing the glare from the headlights of approaching vehicles.

Many devices and systems have been proposed for reducing the glare of automobile headlights. The use of suitable lenses has been a partial solution of the problem but present day headlights still cause too much glare. The problem has been attacked from a different angle by utilizing polarized light in one case and by utilizing colored lights and light filters in another case.

In the case of polarized light, it is difficult to get a suitable source of polarized light and it is even more difficult to get a suitable analyzing device for the driver to look through. The use of colored lights apparently is not feasible both because of the difficulty of getting a satisfactory light source and because of the expense and inefficiency of light filters.

It is, accordingly, an object of my invention to provide an improved automobile lighting system which will overcome the above-mentioned difficulties.

More specifically, it is an object of my invention to provide an automobile lighting system which will eliminate or reduce glare from an approaching car and, at the same time provide suitable illumination for the driver of the automobile equipped with the system.

It is a still further object of my invention to provide a non-glare lighting system for automobiles which is rugged and efficient in operation.

It is a still further object of my invention to provide an improved system for maintaining moving parts in synchronism.

It is a still further object of my invention to provide improved shutters which may be used in my lighting system.

In one embodiment of my invention I provide an automobile with a shutter through which the driver of the automobile will view the roadway. The shutter is operated at a high speed such that it opens and closes at a rate above persistency of vision, 30 times per second, for example. The automobile is also provided with a headlight or headlights which may be flashed on and off at a rate above the persistency of vision in synchronism with the opening and closing of the shutter.

When the shutter is open, the headlight is flashed on; when the shutter is closed, the headlight is off.

By employing such a system on each of two approaching automobiles, and by having the two systems so synchronized that when the headlight of one car is on (and its shutter open) the shutter of the other car is closed, each driver will be unable to see the headlights of the approaching car although he will be able to see the roadway lighted by his own headlights.

In accordance with another embodiment of my invention, I provide an automobile with a shutter and a flashing headlight, as above described, and so design the shutter that it is closed a large percentage of its cycle of operation whereby the conventional headlight on an approaching automobile is materially dimmed. The flashing headlight is flashed on for only a small fraction of the cycle of operation of the shutter at the time the shutter is substantially completely open. In this embodiment of my invention there is no necessity for providing all automobiles with the same type of lighting system and, consequently, there is no problem of synchronizing the lighting systems of approaching automobiles.

Other objects, features and advantages of my invention will appear from the following description taken in connection with the accompanying drawings in which.

Figure 1:
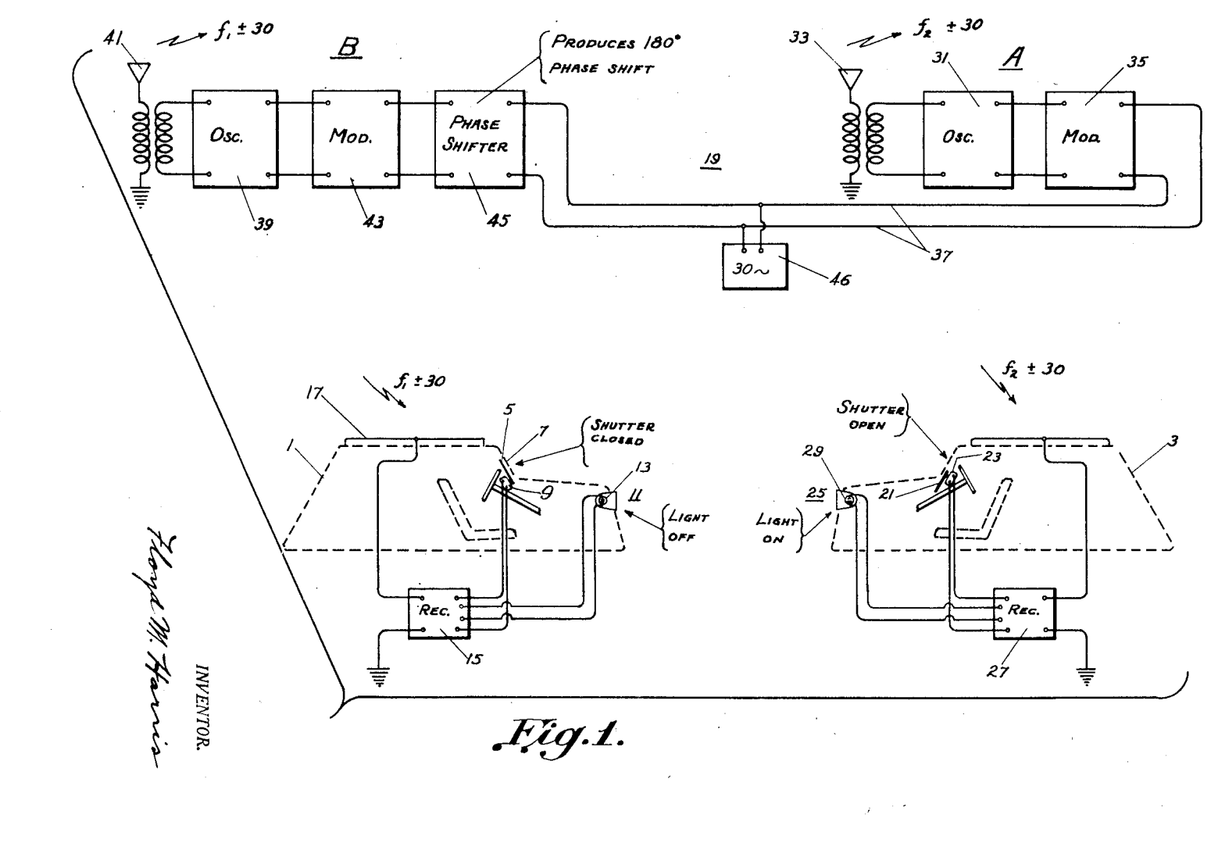
Figure 1 is a schematic diagram of an automobile lighting system embodying my invention.

Referring to Fig. 1, two approaching automobiles are indicated by the dotted lines 1 and 3, respectively. Automobile 1 is equipped with a shutter 5 mounted at the windshield 7 for periodically interrupting the driver's view of the road. In the example illustrated, the shutter 5 is in the form of a half disc which is mounted upon the shaft of a synchronous motor 9 and suitably counterbalanced.

In place of the conventional headlight which gives a continuous light, a headlight 11 is provided which may be flashed in synchronism with the opening and closing of the shutter 5. For example, the usual tungsten lamp may be replaced by any suitable gas lamp such as a mercury vapor lamp, a neon lamp or a sodium-vapor lamp indicated at 13.

The synchronous motor 9 and lamp 13 are connected to the output circuit of a specially designed radio receiver 15 which will be described in detail in connection with Fig. 2.

The input circuit of the radio receiver 15 is connected between a ground and an antenna 17 installed in the automobile.

Synchronizing energy is supplied to the radio receiver from one of the radio transmitters in the transmitting system indicated generally at 19. This transmitting system will be described hereinafter.

Automobile 3 is equipped with a shutter and headlight flashing system which is identical with the system installed in automobile 1. It comprises a shutter 21 driven by a synchronous motor 23, a headlight 25, including a lamp 29 which may be flashed, and a radio receiver 27 to the output circuit of which the motor 23 and the lamp 29 of the headlight 25 are connected.

In operation, the shutter 5 on automobile 1 is closed when the shutter 21 on automobile 3 is open, as indicated on the drawings. Also, the headlight of an automobile is flashed on only when the shutter of that automobile is open. Since the headlight is flashed on at a rate above persistency of vision, thirty times per second for example, it will appear to be on continuously.

Thus, at the instant of operation assumed in Fig. 1, the driver of automobile 3 sees the light supplied by his headlight 25, the shutter 21 being open. He does not see the headlight 11 of approaching automobile 1, however, because at that instant the headlight 11 is dark. The driver of automobile 1 does not see the headlight 25 of the approaching automobile 3 because his view is obstructed by the shutter 5.

In order to operate the shutters and headlights 10 in synchronism in the manner described above, the radio transmitting system 19 is provided which includes transmitters A and B of sufficient power to control the lighting systems of automobiles operating within a given area.

Transmitter A comprises an oscillator 31 for generating a carrier wave having a frequency $f_2$, the oscillator being coupled to an antenna 33. The input circuit of the oscillator is connected to the modulator 35, the input circuit of which is connected to a line 37 for supplying a modulating current to the transmitter.

Transmitter B comprises an oscillator 39 coupled to an antenna 41 and designed to generate a carrier wave having a frequency $f_1$. The input circuit of the oscillator 39 is connected to the output circuit of a modulator 43. The input circuit of the modulator 43 is connected to the line 37 through a phase shifter 45 which introduces a phase shift of 180 degrees in the modulating current.

In the example assumed, where the headlight is flashed 30 times a second, a modulating current having a frequency of 30 cycles per second is supplied to the line 37 from any suitable source 46. A convenient way to obtain a 30 cycle supply is to pass the 60 cycle current of a power line through a multivibrator or the like so that the 30 cycle sub-multiple frequency can be selected from the multivibrator output.

In operation, the transmitter A will radiate a carrier wave of the frequency $f_2$ modulated by a 30 cycle current; the transmitter B will radiate a carrier wave of the frequency $f_1$ modulated by a 30 cycle current which is 180 degrees out of phase with the modulating current for transmitter A.

To understand how the radio transmitting system 19 controls the lighting systems of automobiles, consider a group of automobiles, including automobiles 1 and 3, travelling upon a certain highway, some going in one direction, and some in the opposite direction. Let us assume that automobile 1 is travelling north and that automobile 3 is travelling south, all automobiles on the highway being equipped with lighting systems the same as automobiles 1 and 3.

The receiver 15 of automobile 1 is tuned to the carrier wave of frequency $f_1$ and is, therefore, controlled by station B. The receiver demodulates the carrier wave $f_1$ to supply 30 cycle current to the lamp 13 and the synchronous motor 9 as will be more fully explained later. All automobiles travelling in the same direction as automobile 1 have their receivers tuned to carrier wave $f_1$ whereby their shutters and lights operate in synchronism, all shutters being open at the same instant, and all lights being on at the same instant.

As to automobile 3, and all other automobiles travelling in the same direction as automobile 3, the receiver 27 is tuned to carrier wave $f_2$ whereby the shutters and headlights of these automobiles are controlled by transmitter A. Thus all automobiles travelling in the same direction as automobile 3 have their shutters and lights operating in synchronism.

Since the 30 cycle current supplied to automobile 3 is 180 degrees out of phase with the 30 cycle current supplied to automobile 1, the light of the one car will be off when the light of the other car is on. This will be more clearly understood by referring to Fig. 2.

Figures 2, 3:
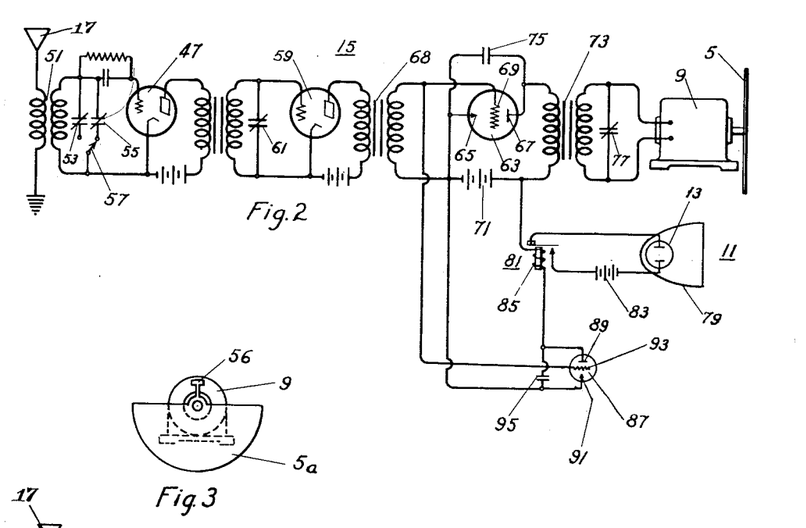
Fig. 2 is a circuit diagram of the apparatus with which each automobile shown in Fig. 1 is equipped.
Fig. 3 is an end view of the shutter and motor shown in Fig. 2.

Fig. 2 shows the receiver 15 of automobile 1 and the manner in which the lamp and shutter motor may be connected to it. It will be understood that the receiver 27 for automobile 3 may be, and preferably is, identical with the one shown in Fig. 2.

The receiver comprises a detector 47 having an input circuit coupled to the antenna 17 through a transformer 51. The detector input circuit may be tuned to either carrier wave frequency $f_1$ or carrier wave frequency $f_2$ by connecting either tuning condenser 53 or tuning condenser 55 across the secondary of transformer 51 by means of a switch 57.

The 30 cycle modulation of the carrier wave will appear in the output circuit of the detector 47 and will be fed to the input circuit of an audio frequency amplifier 59, preferably tuned to 30 cycles by a condenser 61. Instead of connecting the output circuit of the amplifier 59 directly to the synchronous motor 9 which drives the shutter 5, a gas tube relay 63 is preferably connected between the amplifier 59 and the motor in order to supply the motor with more power than can be readily obtained from a conventional audio frequency amplifier.

The relay 63 may be of the Thyratron or grid glow tube type having a cathode 65, an anode 67 and a control electrode 69. The control grid 69 and cathode 65 are connected to the output terminals of a transformer 68 in the output circuit of amplifier 59. The anode 67 is supplied with a suitable positive potential from a suitable source of power such as a battery 71, the connection from the battery 71 to the anode 67 being through the primary winding of a transformer 73.

A condenser 75 is connected between the cathode 65 and the anode 67 for extinguishing the discharge through the relay tube 63 an instant after a discharge has been initiated by a positive potential appearing on the control electrode 69.

The action of the relay tube 63 is as follows: Since a 30 cycle voltage is being impressed upon the relay input electrodes 65 and 69, the control electrode 69 becomes positive 30 times a second. The voltage applied to the anode 67 is such that a current flow through the relay tube is initiated only at the times the control electrode 69 becomes positive, but once initiated, the current flow continues until the voltage between the cathode 65 and the anode 67 is reduced considerably in value. The condenser 75 is for the purpose of causing this reduction in voltage.

The instant the control electrode 69 becomes positive, a pulse of current flows through the primary winding of transformer 73. The current flow is stopped almost immediately, however, because the condenser 75 discharges through the relay tube as soon as the relay discharge starts with the result that for an instant the condenser 75 puts substantially a short circuit across the tube cathode and anode. It will be understood that any other suitable means may be employed for stopping the discharge, such as a relay for opening the plate circuit.

Thus, 30 cycle pulses of current are supplied to the transformer 73, the energy being supplied by the battery 71 and being controlled by the incoming radio energy.

The secondary of the transformer 73 is tuned to 30 cycles by a condenser 77 so that the secondary winding and condenser form a "tank" circuit which causes the 30 cycle pulses to assume the form of a 30 cycle sinusoidal current which is supplied to the synchronous motor 9.

The automobile headlight indicated at 11 comprises the lamp 13 positioned inside a headlight reflector 79. This lamp may be of any type which can be flashed on and off rapidly, such as a mercury vapor lamp, a neon lamp, a sodium-vapor lamp, a lamp containing a mixture of gases or vapors, or a tungsten filament lamp having a thin filament. A gas or vapor lamp is illustrated.

A relay 81 controlled by the radio receiver 15 connects a source of power, such as a battery 83, to the lamp 13 at the rate of 30 times a second.

The winding 85 of the relay 81 is included in the anode circuit of a gas tube relay 87, the anode 89 and cathode 91 of which are connected across the battery 71. The control electrode 93 and the cathode 91 of the relay tube 87 are connected to the output terminals of the transformer 68.

As in the case of relay tube 63, a condenser 95 is connected between the anode 89 and cathode 91 for extinguishing the electric discharge after each positive impulse applied to the electrode 93.

It will be apparent that the gas tube relay 87 will supply 30 pulses per second to the relay 81 whereby the lamp 13 is flashed 30 times per second.

By using the proper type of gas tube relay, the relay tube 87 may be utilized as the headlight lamp, the relay 81 and the lamp 13 being omitted. In this case the relay tube 87 is placed in a headlight reflector. A gas tube relay may be used as a lamp since the flow of current in the relay is due to an ionized gas discharge which produces light.

The shutters on the automobiles 1 and 3 may be of the construction shown in Fig. 3, this being a front view of the schutter 5. It comprises a half disc 5a which is preferably statically and dynamically balanced by means of a weight 56. When the disc is in the position shown, the shutter is open and the driver of the automobile can look over the top of the motor 9 and see the road.

Obviously, by employing a synchronous motor which runs at 1800 R. P. M. (30 R. P. S.) on 30 cycles, it may be so synchronized with the headlight lamp that the lamp is flashed on when the shutter is open. It will be apparent that such a motor is a two pole motor.

From the above description, it will be apparent that the headlights of all cars going in the same direction flash on at the same instant. In the example mentioned, at a given instant the lights of cars going north will flash on, the shutters on these cars being open and the shutters on the cars going south being closed; an instant later the lights on cars going south will flash on, the shutters on these cars being open and the shutters of the approaching cars being closed.

Figure 4:
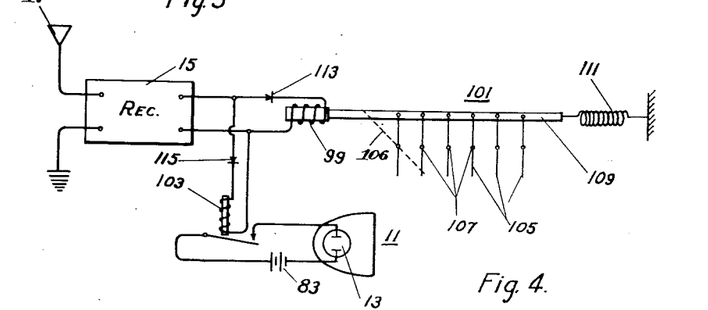
Fig. 4 is a schematic diagram of apparatus which may be substituted for the apparatus shown in Fig. 2.

In Fig. 4, there is shown another type of shutter which may be employed in place of the rotating shutter shown in the preceding figures. In Figs. 2 and 4, like parts are indicated by the same reference numerals. The circuit of Fig. 2 which operates the relay is indicated generally in Fig. 4 by the reference numeral 15. A solenoid winding 99 for operating a shutter 101 is shown connected in parallel with a relay winding 103 for flashing the headlight 11, both windings being connected to the output of the transformer 73 in the receiver.

The view of the shutter 101 in Fig. 4 is a top view. The shutter comprises a plurality of flat strips 105 pivoted at the points 107 to act as shutter vanes. They are pivotally connected to a bar 109 which is operated by the solenoid winding 99. A spring 111 holds the shutter open as shown when no current is flowing through the solenoid winding 99.

Rectifiers 113 and 115 are preferably connected in series with the windings 99 and 103, respectively, to cause uni-directional current pulses to flow therethrough. While they may be so connected that current pulses are applied alternately to the two windings, they are preferably connected as illustrated, the inertia of the shutter being relied upon to keep the shutter open while the light is on.

In operation, a positive half cycle of an incoming synchronizing signal causes a pulse current to flow through the relay and solenoid windings 103 and 99, respectively. This flashes the lamp 13 and closes the shutter 101 an instant later, the inertia of the shutter causing it to remain substantially completely open during the period of the light flash which is preferably very short, one five-hundredths of a second, for example. It will be noted that shutter 101 is closed when the vanes 105 have been turned through an angle indicated by the dotted line 106.

It will be understood that instead of flashing the lamp 13, it may be lighted continuously and the headlights 11 flashed by means of a shutter, similar to the shutter 101, placed in front of headlight 11 and actuated by the relay 103.

Figure 5:
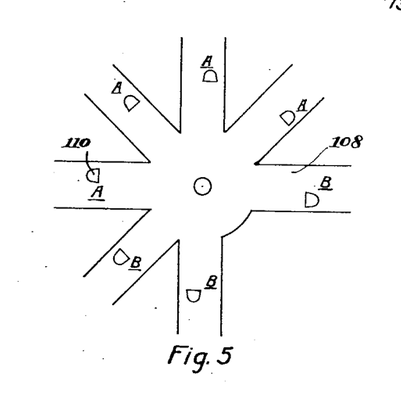
Fig. 5 is a schematic diagram of a traffic control system for use with my improved lighting system.

In Fig. 5, a traffic circle is indicated schematically, together with a plurality of traffic signal lamps A and B. In order to inform the driver of an automobile equipped with the above-described lighting whether his lights are being flashed under the control of the correct radio station, the traffic lights A are flashed under the control of radio transmitter A (Fig. 1) in synchronism with the automobile headlights under the control of transmitter A, while the traffic lights B are flashed under the control of transmitter B (Fig. 1). The traffic lights A and B may be operated by means of a circuit such as shown in Fig. 2.

Assume an automobile equipped with my improved lighting system is travelling from east to west, that is, travelling in the traffic lane 108 towards the traffic circle and the signal lamp 110. According to a prearranged system, this automobile is supposed to have its headlights controlled by radio station B (Fig. 1), while the lights of automobiles travelling in the opposite directions are supposed to be controlled by station A. If the lights of the automobile travelling west are controlled by the correct radio station, the driver of that automobile will not see the signal lamp 110. However, if they are under the control of the wrong radio station, the driver will see signal 110 and be warned to switch the headlight control to the other radio station. This will be done by moving switch 57 (Fig. 2) to the other position.

If the driver makes a right-hand turn, his headlights will still be controlled by the correct radio station, assuming they were properly controlled during the travel east to west. If a left-hand turn is made, a signal lamp under the control of station B will warn the driver to switch the headlight control to the other radio station.

Figure 6:
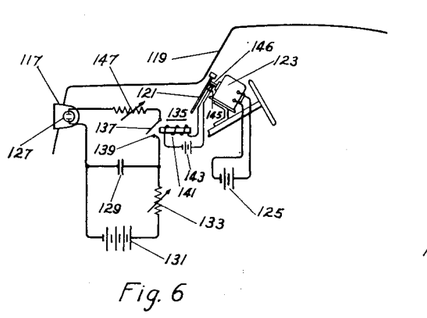
Figs. 6 and 6a are views of another embodiment of my invention.

In Fig. 6, there is illustrated an embodiment of my invention which does not require that the headlights of automobile systems be synchronized. Whereas the system previously described will make the headlight of an approaching automobile invisible, the system described below will dim the headlight of an approaching automobile. Just as in the first system, however, it will provide the driver of an automobile with the same amount of illumination as that provided by a conventional lighting system and it will not cause any more glare than does the usual headlight. Therefore, it is a lighting system which can be applied to any automobile without regard to the lighting system used by other automobiles.

Referring to Fig. 6, the headlight reflector and the windshield of an automobile are indicated at 117 and 119, respectively. A shutter 121, which may be identical with the one shown in Fig. 3, is fastened to the shaft of an electric motor 123 and positioned close to the windshield 119. When the shutter 121 is rotated, it sweeps past the windshield to interrupt the driver's view of the road periodically.

The motor 123 may be of any suitable type, but is preferably a 6 volt direct current motor which may be run at approximately 1800 R. P. M. when connected to the 6 volt automobile battery indicated at 125.

The headlight lamp 127 may be any of the types previously mentioned which can be flashed at the instant the shutter 121 is open. The lamp 127 preferably is flashed by discharging a condenser 129 through it. The condenser 129 may be charged from a source of voltage such as a battery 131 connected across the condenser through a variable resistor 133. By adjusting the resistor 133, the rate at which the condenser 129 is charged may be controlled.

The lamp 127 is connected across the condenser 129 each time the shutter 121 opens by means of a relay 135. The relay 135 comprises an armature 137, a contact point 139 and a relay coil 141, the relay coil 141 being connected through a battery 143 to two contact points 145 which cooperate with a switch segment 146 mounted upon the motor shaft.

When the relay 135 is actuated, the lamp 127 is connected to the condenser 129 through a variable resistor 147 and the relay armature 137 and contact point 139. The rate of condenser discharge is preferably made very rapid, much more rapid than the condenser charging rate, and it may be adjusted by adjusting the resistor 147.

Figure 6A:
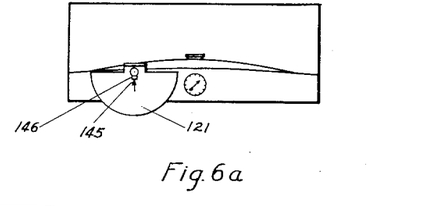

By referring to Fig. 6a, it will be seen that the switch segment 146 and contact points 145 are so located that the relay 135 is operated at the instant the shutter is open. In case there is an appreciable time lag in the relay operation, the position of the contact points (or switch segment) may be adjusted to compensate for the time lag.

The switch segment 146 closes the contacts 145 for only a small fraction of a rotation of the shutter disc so that the relay winding 141 is given a pulse of current to close the lamp circuit also for only a small fraction of a rotation of the shutter disc 121. The armature 137 is biased so that it opens the lamp circuit at the end of the pulse of current.

With the above-described circuit adjustment, the lamp 127 may be lighted only 1/30 of the time while the battery 131 or other current source may be charging the condenser 129 the rest of the time. Therefore, the current source is not required to supply a large amount of energy at short intervals.

In the example assumed where the headlight is on only 1/30 of the time, it will be apparent that, in order to give the headlight the same brilliancy as a headlight on continuously, it must be 30 times as bright while it is on as the headlight on continuously. This is the preferred adjustment of the system as the driver will want as much illumination from his headlight as the automobile laws permit. It will be understood, of course, that the light is flashed at a rate at least equal to that of persistency of vision so that it appears to be a constant light. Thus, the driver of an approaching car will not be aware that the flashing headlight he sees is any different than the usual headlight. If a motor is used which runs the shutter at 1800 R. P. M., the light will be flashed 30 times per second which is well above the rate for persistency of vision.

With regard to the intensity of the light emitted by the flashing lamp, in practice, the permissible duration of a light pulse will be determined in a manner hereinafter described; the frequency of the pulses will then be made high enough to avoid objectionable flicker, and, finally, the intensity of the light pulses will be made such that apparent intensity of the headlight is the same as a standard headlight approved by the automobile laws.

When utilizing a shutter which consists of a half disc, the headlight of an approaching or oncoming automobile will appear to a person looking through the shutter to be dimmed one-half, assuming the approaching headlight is of the conventional type where the light is on continuously. That this is true, is evident from the fact that the rotating half disc intercepts the glare producing light one-half of the time so that only one-half as much light from the oncoming headlight reaches the driver's eyes as when no shutter is employed.

In case the approaching automobile also is equipped with flashing headlights, since there is no attempt to synchronize the headlights on the two automobiles, the driver will see the approaching headlights gradually increasing and decreasing in brilliancy.

Figures 7, 7A, 8, 9:
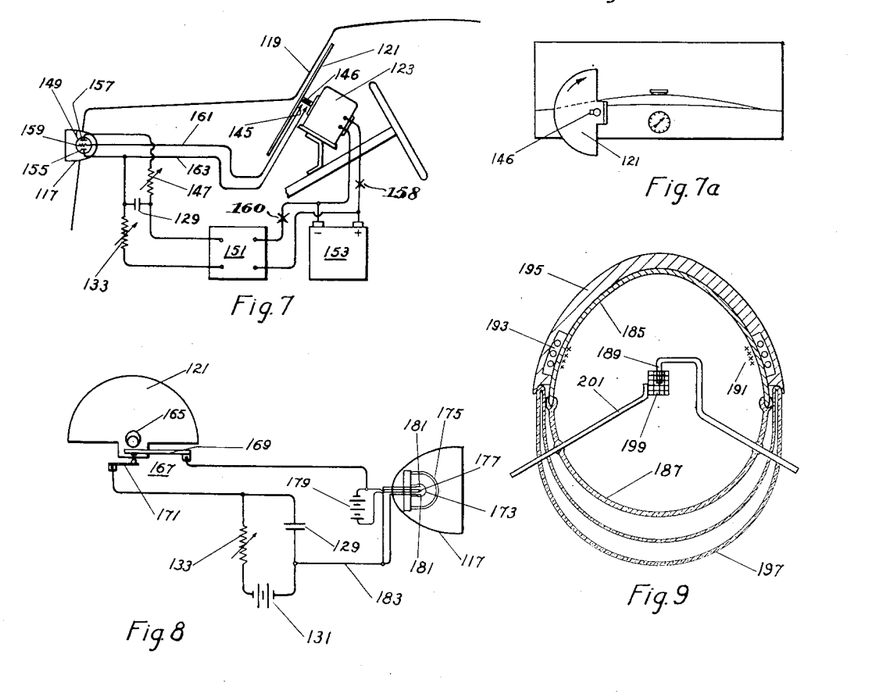
Figs. 7 and 7a are views of a still further embodiment of my invention.
Fig. 8 is a view of a still further embodiment of my invention.
Fig. 9 is a cross-sectional view of an improved vapor lamp and relay especially adapted for use in my invention.

In Fig. 7, there is shown a modified form of the embodiment of my invention shown in Fig. 6. In the two figures like parts are indicated by the same reference numerals. The distinctions between the two systems are that in Fig. 7 the headlight lamp 149 is a gas or vapor lamp having a grid control such as a grid glow tube or, preferably, a sodium vapor lamp provided with a control grid (such as shown in Fig. 9), and that the condenser 129 is charged by means of a vibrator unit 151 which converts the 6 volt output of a storage battery 153 to alternating current, steps up the voltage, and then rectifies it to a high voltage direct current.

It will be noted that power for the complete lighting system is supplied by the 6 volt battery 153, the motor 123 and the input circuit of the vibrator unit 151 being connected in parallel to the battery. The vibrator unit 151, which may be of the type commonly used in automobile radio receivers, has its output terminals connected across the condenser 129 through the variable resistor 133 for controlling the condenser charging rate as in Fig. 6.

The cathode 155 and anode 157 of the lamp are connected across the condenser 129 through the resistor 147 for controlling the discharging rate of the condenser through the lamp, and, as in Fig. 6, the discharging rate is adjusted to be very short compared with the charging rate. This adjustment is especially important when employing the vibrator unit 151 as it permits the use of a vibrator unit with a low current rating.

The control grid 159 and cathode 155 are connected to the switch contact points 145 through conductors 161 and 163 so that when the shutter 121 reaches its open position the control grid is connected to the cathode and the condenser 129 discharges through the lamp 149. This lowers the condenser voltage to a value insufficient to maintain the discharge and the lamp is extinguished. By the time the switch segment 146 has made another rotation to again make contact with the switch points 145, the condenser 129 has again been charged to full voltage and the operation is repeated.

The position of the shutter disc 121 in Fig. 7 is shown more clearly in Fig. 7a. In this position the shutter is closing and the condenser is being charged for again flashing the lamp.

In order to provide a headlight which gives sufficient illumination, it is desirable that the flash of the lamp be long enough to make the length of time the lamp is actually lighted a reasonable percentage of the total time. If the lamp is on 1/30 of the time, as previously suggested, the intensity of light required for each flash is not unreasonable. Although the shutter is completely open only at the time the straight edge of the shutter disc 121 is horizontal, as shown in Fig. 6a, it is open for all practical purposes while the straight edge is rotating through approximately 6 degrees each side of this position, or through a total of 12 degrees.

While the shutter disc 121 is rotating through the above-mentioned 12 degrees, the light from lamp 149 (or lamp 127) may be on and a driver looking through the shutter will get the full benefit of his own headlight. It will be evident that by having the light on during 12 degrees rotation of the shutter, it is on 12/360 or 1/30 of a complete rotation. If the shutter rotates 30 times per second, the duration of a light flash is then 1/30 times 1/30 of a second or 1/900 of a second. By adjusting the variable resistor 147, the discharging rate of the condenser can readily be made such that the light flash will last just 1/900 of a second.

Any suitable contact making device may be substituted for the switch segment 146 and contact points or brushes 145. For example, a cam 165 may be fastened on the motor shaft, as shown in Fig. 8, for periodically closing a switch 167. The switch 167 may comprise two spring arms 169 and 171 having contact points mounted on their free ends.

The lamp flashing circuit which is illustrated in Fig. 8 is the same as the one shown in Fig. 6, like parts in the two figures being indicated by the same reference numerals.

A sodium vapor lamp 173 is shown as the headlight lamp. This lamp comprises a glass envelope which contains sodium vapor and which is enclosed by a double walled evacuated glass shell 175 (generally referred to as a Dewar flask) for preventing the envelope from cooling off sufficiently to prevent the maintenance of the proper vapor pressure.

The envelope contains a cathode 177 which is heated by a battery 179. The lamp anode consists of two plates 181 placed on opposite sides of the cathode 177. They are both connected to one terminal of the condenser 129 through a conductor 183. If desired, only one anode plate may be employed. It will be understood that a current limiting resistor may be connected in series with lamp 173.

Where a grid controlled lamp is utilized as in Fig. 7, a switching device may be employed which does not require mechanical contact of the switch parts. For example, the lamp circuit may be so adjusted that the lamp will flash if a certain amount of capacity is inserted between the control grid 159 and cathode 155. One way of inserting this capacity periodically is to replace the contact points 145 by small condenser plates so positioned that the segment 146 will rotate to a position close to but not in contact with them. When segment 146 rotates to this position, the capacity between the grid and cathode will be increased and the lamp will flash.

In Fig. 9 there is illustrated a grid controlled sodium lamp especially adapted for use in my lighting system. It comprises an envelope containing sodium vapor and consisting of a metal section 185 sealed to a glass section or window 187. The metal to glass seal may be the same type of seal used in water-cooled radio transmitter tubes.

An anode 189 consisting of a metal wire or rod is centrally positioned in the envelope and supported by being sealed into the glass section 187.

The metal section 185 itself functions as the lamp cathode. If a hot-cathode type of lamp is desired, the inner surface of the metal section adjacent to the anode may be coated by any well known electron emitting material, such as a barium oxide paste, as indicated at 191.

The lamp is provided with a heater coil 193 encircling the metal section 185 for the purpose of keeping the lamp sufficiently hot to maintain the proper sodium vapor pressure in the envelope. In case an electron emitting coating is utilized, the heater coil 193 also maintains the cathode at an electron emitting temperature.

In order to conserve the heat from the heater coil 193 for keeping the lamp envelope at the desired temperature, the metal section of the envelope is covered with a heat insulating material 195 and the glass section of the envelope is enclosed by a double-walled evacuated glass shell or Dewar flask 197 which abuts the heat insulating material 195.

The control grid 199 consists of a cylinder of wire mesh which surrounds the anode 189 and is properly spaced therefrom in accordance with well known theory. The mesh cylinder 199 is supported by a rod 201 sealed in the glass section 187 of the envelope.

If a grid controlled lamp is not desired, the control electrode may be omitted and the lamp used as a two electrode sodium lamp.

In addition to acting as a cathode and as a portion of the envelope, the metal section 185 also acts as a reflector whereby practically all the light of the sodium vapor discharge passes through the glass window 187. The section 185 is preferably either parabolic or semispherical in shape and is provided with a highly polished interior surface.

The above-described grid controlled sodium vapor lamp may be utilized in the circuit shown in Fig. 7, the vibrator unit 151 being designed to deliver a suitable output voltage for a sodium vapor lamp. Since sodium vapor has a low ionization potential, it may be desirable in some cases to omit the vibrator unit entirely and connect the condenser and resistor directly to a storage battery.

Figures 10, 11, 11A, 12, 12A, 13, 13A:
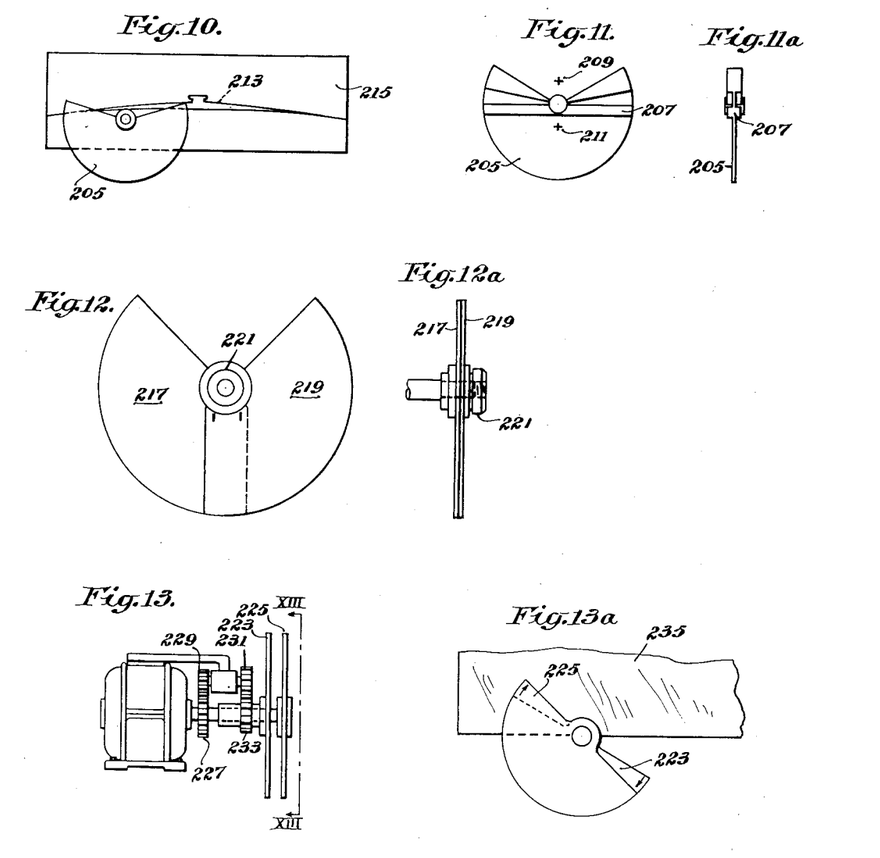
Fig. 10 is a view of one preferred form of shutter showing how it is preferably mounted on the automobile.
Fig. 11 is a front view of the shutter shown in Fig. 10, showing one way of balancing it.
Fig. 11a is a side view of the shutter shown in Fig. 11.
Fig. 12 is a front view of another form of shutter embodying my invention.
Fig. 12a is a side view of the shutter shown in Fig. 12.
Fig. 13 is a side view of another form of shutter embodying my invention.
Fig. 13a is a front view of the shutter shown in Fig. 13.

In Figs. 10, 11 and 11a, there is illustrated a shutter which may be employed in place of the shutter shown in Fig. 3. It consists of a disc 205 which has approximately a 120 degree segment cut out. This provides a shutter that will dim approaching headlights two-thirds and it also permits proper counterbalancing of the disc.

As indicated in Figs. 11 and 11a, the portions of the disc near the edges of the 120 degree opening are made thicker and heavier than the main part of the disc. The entire lower half of the disc may be made as light and thin as consistent with the necessary rigidity, or the center of gravity of the lower half may be brought nearer to the shaft by increasing the thickness of the disc along a line just below the center of the disc as indicated at 207. This structure permits making the center of gravity of the upper half of the disc the same distance from the shaft as the center of gravity of the lower half of the disc as indicated at 209 and 211. Then, by making the moments of inertia of the two halves of the disc equal, the shutter will be both statically and dynamically balanced.

When employing the shutter just described, it is preferable to make the duration of a light flash shorter and the light correspondingly more intense than specified in connection with the half-disc shutter, so that the light will be on only when the shutter is in substantially the position shown in Fig. 10. It will be noted that with the shutter mounted as illustrated, the two disc segments of the upper half of the disc do not obstruct the view of the driver since the right-hand segment intercepts a line of view which is ordinarily intercepted by the engine hood 213 while the left-hand segment is in the lower left-hand corner of the windshield 215 through which the driver does not ordinarily look.

Figs. 12 and 12a show a shutter disc made in two sections 217 and 219 which may be locked in position by a thumb nut 221 when the shutter is to be used at night. When the shutter is not in use, the thumb nut is loosened and the two sections are rotated to increase the angle of the shutter opening whereby the driver is given a perfectly unobstructed view for daylight driving. This structure permits the use of a smaller shutter opening than otherwise permissible and a greater dimming of approaching headlights.

In Figs. 13, 14, 15 and 16 there are shown several forms of shutters which may be substituted for the single-disc type of shutter previously described. These shutters, which include two rotating shutter discs or disc segments, are a preferred type of shutter because they are closed at least three-fourths of the time whereby at least three-fourths of the glare of an approaching headlight is eliminated.

Referring to Figs. 13 and 13a, the shutter comprises two half discs 223 and 225. The disc 225 is fastened to the motor shaft so that it rotates at the speed of the motor. The disc 223 is concentrically mounted on the motor shaft and driven by the motor through a gear train which includes a gear 227 fastened to the motor shaft which gear engages a gear 229 on a countershaft. Another gear 231 on the countershaft engages a gear 233 on the hollow shaft of the disc 223 and drives the disc 223 in the same direction as the disc 225 but at one-half the speed. For example, if the motor has a speed of 3600 R. P. M., the disc 223 will be rotated at 1800 R. P. M.

This shutter, as well as the shutters described hereinafter, is preferably mounted adjacent to the automobile windshield in the same manner as the previously described single-disc shutters. Also, a switch on the shutter shaft causes the automobile headlight to flash when the shutter is open as previously described. It will be understood that the shutter is completely open when the half discs are facing each other on the same side of the shutter shaft.

This is indicated in Fig. 13a where the shutter is shown just beginning to close. It will also be apparent from Fig. 13a that the two discs are so connected to each other through the gears that the shutter opens opposite the windshield indicated at 235.

The number of times per second that the shutter is open is determined by the lower speed disc. Therefore, if the motor speed is 3600 R. P. M., the shutter opens 30 times per second. If a lower speed motor is used, the geared disc may be made the higher speed disc. Thus, if the motor runs at 1800 R. P. M., the disc which is driven through the gears may be run at 3600 R. P. M.

That the shutter is closed three-fourths of the time will be seen by considering each quarter rotation of the slower disc. Starting from the open shutter position and assuming a direction of rotation indicated by the arrows in Fig. 13a, during the first quarter rotation of disc 223, the disc 225 makes a half rotation and completely closes the shutter. During the next quarter rotation of disc 223, the shutter is completely closed by the two shutter discs and the disc 225 has made one complete rotation.

During the third quarter rotation of disc 223, the shutter is still completely closed as the faster disc 225 closes the opening permitted by the slower disc 223, and at the end of this quarter the disc 225 is in its upper position completely closing the shutter. During the last quarter rotation of the disc 223, the shutter is opening and at the end of the quarter the two discs are facing each other in their lower position and the shutter is completely open.

Since the shutter cuts out half the light when closing and half the light when opening, and since the shutter is completely closed for one-half of a rotation, it cuts out three-fourths of the light, and correspondingly reduces the glare of headlights.

Figure 14:
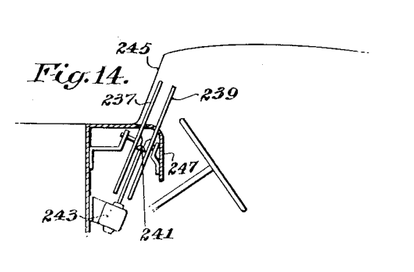
Fig. 14 is a view showing still another form of shutter embodying my invention, and also showing a preferred way of installing it in an automobile.

Referring to Fig. 14, there is shown a shutter comprising two disc segments 237 and 239 (such as the one shown in Fig. 10) which are rotated in opposite directions at the same speed. The disc segments are mounted upon separate shafts which are coaxially mounted. Each shaft has a gear wheel fastened on one end, the two gears facing each other and meshing with a third gear wheel 241 fastened to the shaft of a motor 243. Assuming that the disc segments are of the shape shown in Fig. 10, this shutter will be closed more than three-fourths of the time.

The shutter is preferably mounted opposite the windshield 245 as shown, with the lower part of the shutter discs concealed by the instrument panel 247 of the automobile. The shutter discs are shown extending through slits in the upper part of the panel member 247. It will be evident that this arrangement causes the instrument panel to act as a guard for the lower part of the shutter.

Figure 15:
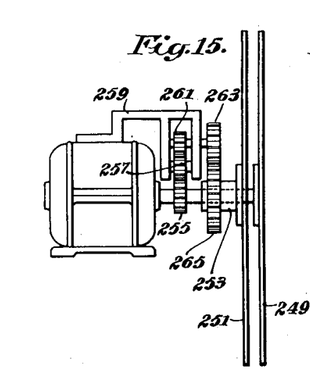
Fig. 15 is a side view showing a modified form of the shutter shown in Fig. 14.

In Fig. 15 there is shown another shutter comprising two half discs which are rotated in opposite directions at the same speed. The shutter comprises a half disc 249 fastened to the shaft of a motor, and a half disc 251 concentrically and rotatably mounted on the motor shaft by means of a sleeve 253.

The disc 251 is rotated at the same speed as the disc 249 and in the opposite direction by means of a gear train which includes a gear wheel 255 fastened to the motor shaft and engaging an idler gear 257 supported by a bracket 259. The idler gear engages a gear 261 on a countershaft and the disc 251 is driven by the countershaft through gears 263 and 265.

If it is desired that the shutter open 30 times a second, the two discs will be rotated at 1800 R. P. M. Like the shutter shown in Fig. 13, it is completely closed during a half rotation and is either opening or closing during the other half rotation.

Figure 15A:
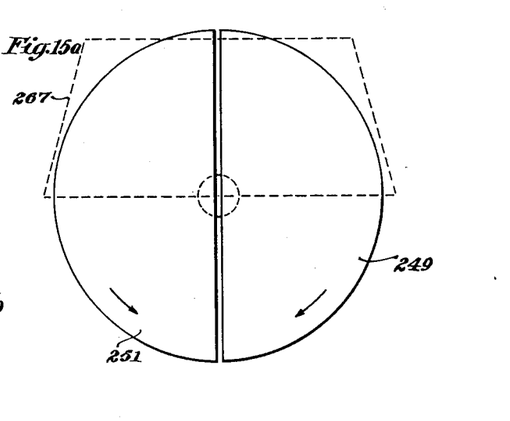
Fig. 15a is a front view of the shutter shown in Fig. 15.

In Fig. 15a the shutter is shown in the closed position and just beginning to open. The direction of rotation of the shutter discs is indicated by the arrows. As in the case of the other double disc shutters, the discs 249 and 251 are so coupled through the gearing that the shutter is open when the discs are below the shutter shaft so that the shutter opening comes opposite the windshield indicated by the dotted line 267.

Figure 16:
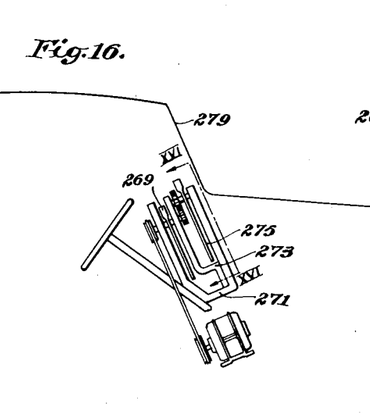
Fig. 16 is a side view of another modified form of the shutter shown in Fig. 14.

Referring to Fig. 16, there is shown a shutter which differs from the one shown in Fig. 15 mainly in that the shafts of the two shutter discs are offset in order to simplify the gearing. The shutter comprises a disc segment 269 fastened on a shaft which, at one end, is journaled in one leg of a U-shaped support 271. The other end of the shaft is journaled in a supporting arm 273 mounted on the U-shaped support.

The other disc segment 275 is fastened to a shaft mounted above the shaft for disc 269 and journaled in the supporting arm 273 and the other leg of the U-shaped support 271.

The discs 269 and 275 are coupled together for synchronous rotation in opposite directions by means of gear wheels fastened to the two shafts. The two gear wheels have a one to one ratio so that the two shutter discs rotate at the same speed. It will be apparent that the operation of this shutter is the same as the operation of the shutters shown in Figs. 14 and 15.

The shutter may be driven by a motor through a belt drive, as shown in the drawings, or one shutter disc may be fastened directly on the motor shaft for direct drive. The shutter is preferably mounted at the same angle to the vertical as the windshield, indicated at 279, in order to conserve space.

Figure 16A:
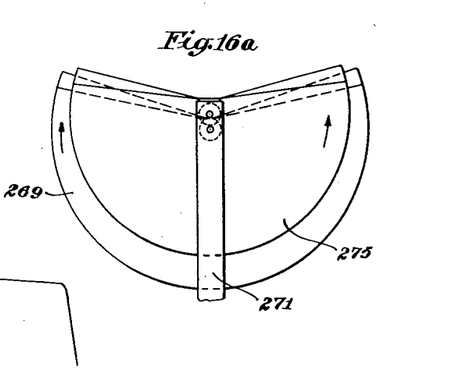
Fig. 16a is a view looking in the direction of the arrows XVI—XVI in Fig. 16.

Fig. 16a is a view taken on the line 16 in Fig. 16 showing the shape of the shutter discs. By making each disc somewhat more than a full half disc, the shutter will be effectively closed more than three-fourths of the time and thus be more effective in reducing glare. Also, it permits balancing the discs by making the upper edges of a disc thicker than the rest of the disc as indicated on the drawings.

It may be noted that the shutters shown in Fig. 13, 14 and 15 may be provided with discs shaped and balanced as shown in Figs. 16 and 16a.

Figure 17:
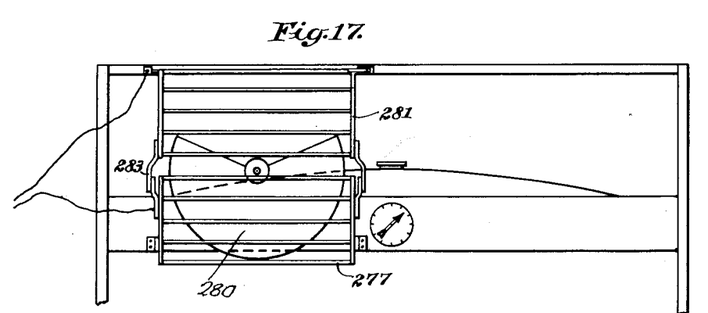
Fig. 17 is a view looking from the driver's seat toward the front of the automobile showing a guard arrangement for a shutter utilized in my invention.

Referring to Fig. 17, there is illustrated one form of guard for the rotating shutter disc or discs. The guard is in two sections, the lower section 277 comprising a grating of parallel bars fixedly mounted opposite the lower part of the shutter disc 280. The upper section 281 comprises a similar grating of bars pivotally mounted at the top of the windshield whereby the guard section 281 may be turned against the roof of the car when the shutter is not in use. Thus, the guard will not obstruct the driver's view even a slight amount during daylight driving.

An interlock switch 283 is provided which prevents power from being supplied to the shutter motor before the guard is pulled down into a position opposite the upper part of the shutter disc. This switch may be located in the circuit of Fig. 7 at the point 158.

Figures 18, 19:
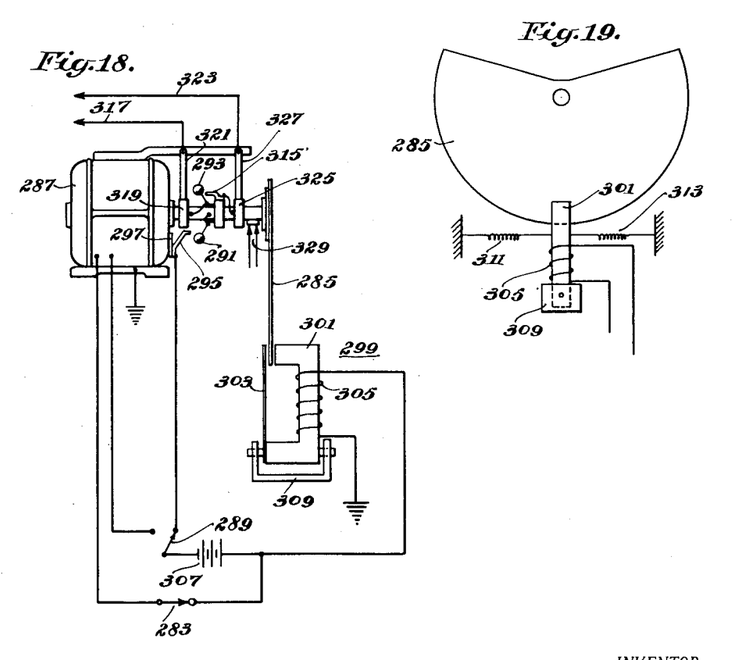
Fig. 18 is a circuit and schematic diagram, including a side view of a brake, of a control circuit for a lighting system embodying my invention.
Fig. 19 is a front view of the brake shown in Fig. 18.

Referring to Fig. 18, there is shown a control system which causes the shutter 285 always to stop in its open position when the headlights are turned off. The system also automatically supplies power to the headlight lamp circuit as soon as the motor 287 reaches such a speed that the headlights will flash at or near the rate of persistency of vision whereby the headlights will not have an undesirable flicker when the motor is first started.

Power may be supplied to the shutter motor 287, after the shutter interlock switch 283 has been closed, by moving the starting switch 289 to the left-hand position.

Two governor balls 291 and 293, each fastened to one end of a flat flexible spring, are mounted upon the motor shaft diametrically opposite each other. The governor ball 291 is electrically connected with the motor shaft and so positioned that when the shutter is rotating at a slow speed it will make contact with a contact arm 295 supported by an insulating plate 297. This contact is made when the shutter is in the open position, as indicated in the drawings, and, as soon as the contact is made, a magnetic brake 299 is energized.

The brake 299 comprises a U-shaped core 301 having an armature 303 of magnetic material fastened to one leg of the core and extending to a point opposite and spaced away from the other leg of the core. A disc or vane, which may be the shutter disc 285 itself, as shown in the drawings, extends between the armature 303 and the core 301 when the shutter is in its open position.

The core is provided with a winding 305 for energizing the brake, one end of the coil being connected to a terminal of the battery 307 while the other end of the coil is connected to the frame of the motor and the motor shaft through ground.

The brake 299 is preferably flexibly mounted, as shown in Figs. 18 and 19, in order to minimize the shock caused by the brake suddenly stopping the shutter. Such a mounting may be obtained by pivotally mounting the lower leg of the core 301 on a supporting member 309. The core is held in a central position by means of two springs 311 and 313 on opposite sides of the core, each fastened at one end to the core and at the other end to a support.

When it is desired to stop the shutter 285, the starting switch 289 is thrown to the right-hand position. This takes power off the motor and closes the brake circuit at one point. As the shutter 285 slows down, the governor ball 291 moves closer to the motor shaft until, when the shutter speed is low enough to permit application of the magnetic brake, the ball 291 (or its supporting spring) makes contact with the contact arm 295 and the brake is instantly energized.

Energization of the brake pulls the armature 303 toward the end of the core leg whereby the shutter disc 285 is clamped so firmly between armature and core that but little, if any, slippage is permitted between the disc and the brake. The flexible brake mounting, however, permits the brake to swing with the shutter movement until the disc stops. The brake and shutter are then pulled back to the central position by one of the springs 311 and 313.

In order to make the brake more effective, assuming the shutter disc is of non-magnetic material, an insert of magnetic material may be placed in the shutter disc at a point where it will be between the armature and the core when the brake is energized.

It will be noted that the brake is released when the starting switch 289 is moved to the left-hand or starting position.

Referring, now, to the centrifugal switch control of the headlight, the governor ball 293 is insulated from the motor shaft and so mounted with respect to a contact member 315 that, when the shutter reaches a speed such that it will flash the headlight at a rate above persistency of vision, the governor ball 293 (or its supporting spring) will make contact with the contact member 315 thereby connecting the power supply to the lamp flashing condenser 129 (Fig. 7).

The switch consisting of governor ball 293 and contact 315 may be inserted in the circuit of Fig. 7 at the point 160.

The governor ball 293 is connected to one of the power supply conductors 317 through a ring 319 and brush 321, while the contact member 315 is connected to the other conductor 323 through a ring 325 and brush 327.

The switch which makes the headlight flash in synchronism with the opening of the shutter is indicated at 329.

Various other modifications may be made in my invention without departing from the spirit and scope thereof, and I desire, therefore, that only such limitations shall be placed thereon as are necessitated by the prior art and set forth in the appended claims.

I claim as my invention:

1. In a vehicle, a windshield, a shutter comprising two disc segments which have poor light transmitting ability, means for rotatably mounting said discs with their axes positioned close together and with said axes located near the bottom of said windshield, and means for rotating said disc segments in opposite directions at the same speed.

2. In a vehicle, a windshield, a shutter comprising two disc segments which have poor light-transmitting ability, means for rotatably mounting said disc segments with their axes located near the bottom of said windshield, means for so rotating said disc segments in a fixed time relation with respect to each other that they periodically assume a position facing each other at substantially their lowest position during a rotation whereby the shutter is opened to permit an unobstructed view through said windshield.

3. A lighting system for two approaching vehicles travelling in opposite directions, each vehicle having a headlight and having a shutter positioned to intercept the view of the driver of the vehicle periodically, means including a radio receiver in each of said vehicles and a radio transmitter for flashing said headlights alternately at a rate at least equal to that of persistency of vision, and means for alternately closing said shutters in such time relation with the flashing of said headlights that the shutter of one vehicle is open when the headlight of said vehicle is lighted and the headlight of the other vehicle is dark.

4. In a vehicle lighting system, means comprising a rotatable shutter for intercepting the view of the driver of the vehicle periodically at a rate at least equal to that of persistency of vision, means on said vehicle for lighting the roadway only in response to said shutter reaching a position where it is not intercepting said view and only for the period said shutter is not intercepting said view, and means for automatically stopping said shutter in its open position in response to said shutter slowing down to a predetermined speed.

5. In a vehicle having a windshield, a shutter comprising two disc segments which have poor light-transmitting ability, means for rotatably mounting said disc segments with their axes located near the bottom of said windshield, means for rotating said disc segments in such time relation with respect to each other that they periodically assume a position facing each other at substantially their lowest position during a rotation whereby the shutter is opened to permit an unobstructed view through said windshield, a headlight for said vehicle and means responsive to the position of said disc segments for projecting light therefrom, when, and only when, said view is substantially unobstructed.

6. A vehicle lighting system comprising a plurality of opaque disc segments, means for rotatably mounting said segments with their axes positioned close together and so located that said mounting means does not obstruct the driver's view of the roadway, means for so rotating said segments in a fixed time relation with respect to each other that they periodically interrupt the driver's view of the roadway at a rate at least equal to that of persistency of vision and periodically assume a position facing each other where they do not obstruct said view, and means responsive to the position of said disc segments for projecting a light periodically from said vehicle upon said roadway during the periods when said segments are not obstructing said view.

7. In a vehicle lighting system, means comprising a rotatable shutter for intercepting the view of the driver of the vehicle periodically at a rate at least equal to that of persistency of vision, means on said vehicle for lighting the roadway only in response to said shutter reaching a position where it is not intercepting said view and only for the period said shutter is not intercepting said view, and means for automatically making said lighting means ineffective in response to said shutter slowing down to a predetermined speed.

8. In a vehicle lighting system, means comprising a rotatable shutter for intercepting the view of the driver of the vehicle periodically at a rate at least equal to that of persistency of vision, means on said vehicle for lighting the roadway only in response to said shutter reaching a position where it is not intercepting said view and only for the period said shutter is not intercepting said view, and means for automatically stopping said shutter in its open position and making said lighting means ineffective in response to said shutter slowing down to a predetermined speed.

9. In a vehicle lighting system, a shutter comprising two disc sectors, means for rotatably and coaxially mounting said disc sectors in a position where they periodically intercept the driver's view of the road, a bevel gear coaxially mounted with respect to one of said disc sectors and coupled thereto, a second bevel gear coaxially mounted with respect to the other of said disc sectors and coupled thereto, said gears being mounted face to face whereby they may be engaged by a third bevel gear, a shaft extending between said disc sectors and at right angles to their axis, a third bevel gear mounted on the end of said shaft and in engagement with said other gears whereby rotation of said shaft causes said disc sectors to rotate in opposite directions, and means for rotating said disc sectors through said shaft at a rate measured in rotations per second which is at least equal to that of persistency of vision.

10. In a lighting system for a vehicle having a windshield and an instrument panel below said windshield, a shutter comprising two disc sectors, means for rotatably and coaxially mounting said disc sectors in a position where they periodically intercept the driver's view of the road, a bevel gear coaxially mounted with respect to one of said disc sectors and coupled thereto, a second bevel gear coaxially mounted with respect to the other of said disc sectors and coupled thereto, said gears being mounted fact to face whereby they may be engaged by a third bevel gear, a shaft extending between said disc sectors and at right angles to their axis, a third bevel gear mounted on the end of said shaft and in engagement with said other gears whereby rotation of said shaft causes said disc sectors to rotate in opposite directions, the axis of said disc sectors being so located that in their lower position during rotation at least a portion of said disc sectors are behind said panel, said gears being so meshed that said sectors rotate to a position facing each other when they are in substantially their lowest position during rotation, and means for rotating said disc sectors through said shaft at a rate measured in rotations per second which is at least equal to that of persistency of vision.

11. A lighting system for two approaching vehicles travelling in opposite directions, each vehicle having a headlight and having a rotatable shutter positioned to intercept periodically the view of the driver of the vehicle, each vehicle having a synchronous motor which runs at 1800 R. P. M. on 30 cycles coupled to the shutter on the vehicle, means for flashing the headlight on each vehicle each time the shutter on the vehicle opens, means for radiating a carrier wave modulated by a signal having a certain frequency, means for radiating a second carried wave of a different frequency modulated by a signal having said certain frequency and 180 degrees out of phase with said first signal, means on one of said vehicles for receiving, demodulating, and amplifying said first carrier wave and for driving the synchronous motor on said vehicle by said amplified signal, and means on the other of said vehicles for receiving, demodulating, and amplifying said second carrier wave and for driving the synchronous motor on said other vehicle by said second amplified signal.

12. The invention according to claim 11 characterized in that said certain frequency is at least equal to that of persistence of vision.

13. In a vehicle lighting system, a shutter comprising at least two opaque disc segments, means for so rotatably mounting said segments that they may be rotated to a position facing each other on one side of a horizontal line drawn through the axis of rotation of one of said segments, said mounting means being so positioned that said segments do not obstruct the driver's view of the road when they are in said position facing each other and interrupt said view periodically as they are rotated, means for so rotating said segments that they interrupt said view at a rate at least equal to that of persistency of vision, a headlight mounted on said vehicle, and means for flashing said headlight each time said segments reach a position where said view is not obstructed and only for the period said view is not obstructed whereby said road appears to be continuously illuminated.

14. In a vehicle lighting system, a shutter disc segment occupying at least 180 degrees and having two radial edges, means for rotatably mounting said segment, said segment being so positioned as to interrupt the driver's view of the road periodically as it is rotated, means for rotating said disc segment at a rate measured in rotations per second at least equal to that of persistency of vision, a headlight, and means for flashing said headlight once for each rotation of said disc segment and only for a period during which the angle formed by said radial edges is approximately bisected by a vertical plane through and parallel to the axis of rotation of said disc.

FLOYD M. HARRIS.